United States Patent [19]
Brask et al.

[11] Patent Number: 5,819,602
[45] Date of Patent: Oct. 13, 1998

[54] OPTICAL FIBER COATING STRIPPING

[75] Inventors: Debra June Brask, Bridgewater; David Stephen DeVincentis, Flanders; Robert Allen Hikes, Bridgewater, all of N.J.

[73] Assignee: Lucent Technologies, Inc., Murray Hill, N.J.

[21] Appl. No.: 596,802

[22] Filed: Feb. 5, 1996

[51] Int. Cl.[6] ............................................. H02G 1/12
[52] U.S. Cl. ................................. 81/9.51; 81/9.41
[58] Field of Search .................... 81/9.4, 9.41, 9.42, 81/9.43, 9.51

[56] References Cited

U.S. PATENT DOCUMENTS

| | | | |
|---|---|---|---|
| 967,635 | 8/1910 | Hewitt | 81/9.51 X |
| 980,600 | 1/1911 | Church | 81/9.51 X |
| 2,523,936 | 9/1950 | Axelsen | 81/9.42 |
| 2,929,285 | 3/1960 | Gulemi | 81/9.51 |
| 3,153,358 | 10/1964 | Havens | 81/9.51 |
| 4,914,986 | 4/1990 | Masaki | 81/9.51 |

*Primary Examiner*—D. S. Meislin

[57] ABSTRACT

Apparatus for stripping a thin color-encoded plastic coating from an optical fiber comprises an elongated rail and clamps for fixedly mounting a fiber spaced above and parallel to the rail. A chuck having radially convergible jaws is mounted on the rail for movement therealong, and a lifting mechanism is provided for lifting the chuck towards the clamped fiber for disposing the fiber within the chuck and coaxial therewith. A stripping process comprises converging the jaws into a slightly compressive engagement with the fiber outer surface and sliding the compressively engaged chuck back and forth along the rail one or more times for abrasion removal of the fiber plastic coating.

7 Claims, 5 Drawing Sheets

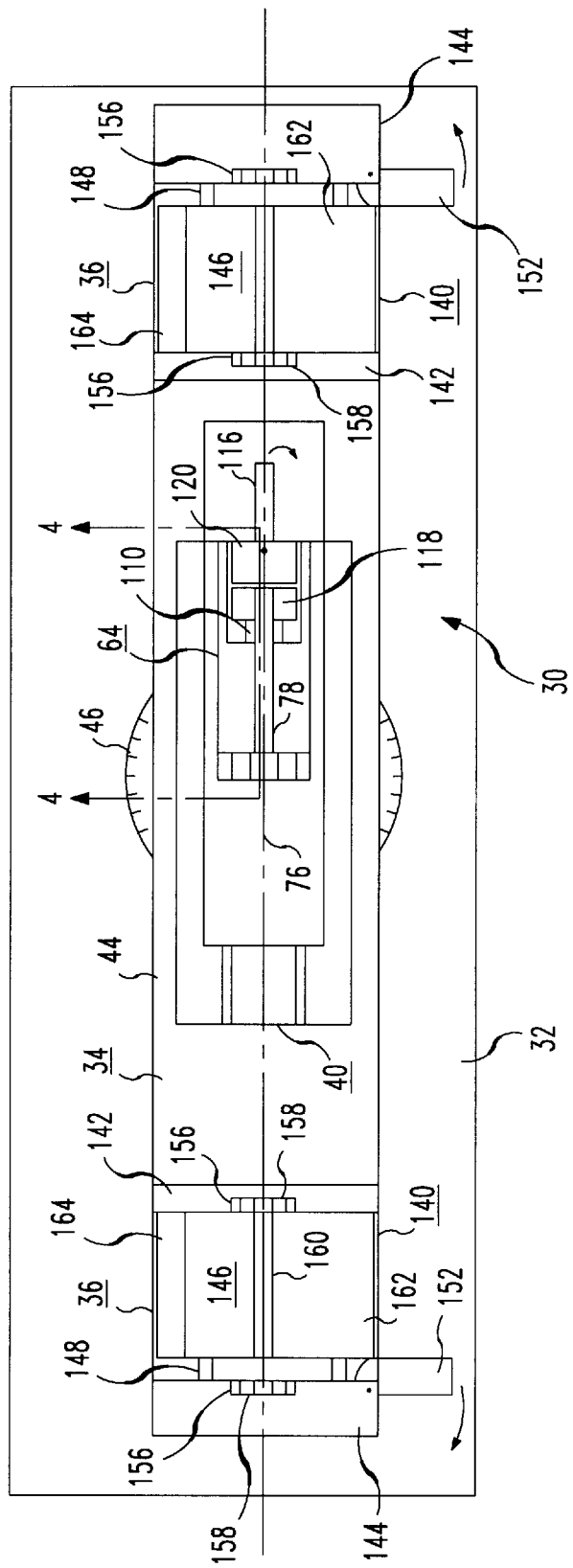

OPTICAL FIBER COATING STRIPPING

This invention was made with Government support under a Government contract. The Government has certain rights in this invention.

BACKGROUND OF THE INVENTION

This invention relates to optical fibers and particularly to a method and apparatus for removing or stripping away an extremely thin, outer color coating of an optical fiber without damaging the underlying fiber.

Optical fibers are now extensively used. In the field, main distribution cables comprising a large number of individual fibers are laid and individual branching lines are connected to respective cable fibers using known splicing techniques. Typically, the various cable fibers are color coded for identification purposes and a recent development is the use of colored "UV acrylate" coatings. Such coatings are plastic-like materials which are applied as a fluid and then chemically hardened using UV radiation.

Prior to the splicing operation, it is desirable to first completely remove the coloring material from the region of the splice being made. This is because the coloring pigments used in the color coating tend to interfere with chemical etchants used in a preferred splicing process.

A typical optical fiber has a diameter of 250 microns and the outer UV acrylate coating typically has a thickness of 2.5 microns. A desirable quality of the UV acrylate coating is that, in spite of its extreme thinness, it is relatively hard and durable and adheres well to the underlying fiber. However, owing to its extreme thinness and good adherence, a problem is presented as to how, under field conditions and preferably with simple hand held tools, to efficiently remove the colored coating without damage of the underlying fiber.

SUMMARY OF THE INVENTION

A method of stripping a thin, outer color coating from a fiber comprises disposing the fiber along a passageway through a chuck assembly including convergible jaws, converging the jaws against one another to define a cylindrical surface compressively engaged with the fiber outer surface, and sliding the chuck assembly axially relative to the fiber for abrading and removing the outer coating. Preferably, the chuck assembly is slid back and forth a few times relative to the fiber for completely removing the coating.

Apparatus for performing the method comprises a rail, a chuck assembly including radially convergible jaws mounted on the rail for movement therealong, clamp means for mounting a fiber in fixed, parallel and spaced above relationship with the rail, means for lifting the chuck assembly towards and around the fiber for disposing the fiber axially within the chuck assembly, means for closing the radially convergible jaws against one another for defining a cylindrical surface in slightly clamped relationship around the fiber, and means for sliding the chuck assembly back and forth along the rail and along the fixed fiber for abrasion removal of the outer coating of the fiber.

DESCRIPTION OF THE DRAWING

The drawing figures are schematic and not necessarily to scale.

FIG. 3 is a plan view of the apparatus shown in FIG. 2;

DESCRIPTION OF PREFERRED EMBODIMENTS OF THE INVENTION

Figure 1:
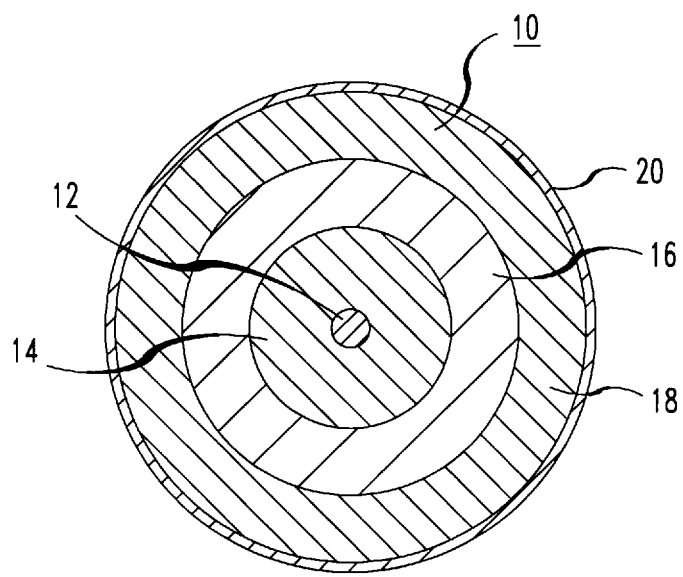
FIG. 1 is a cross-section of an optical fiber having an outer, color coating to be removed according to the present invention.

A cross-section of an optical fiber 10 which can be worked on according to the present invention is shown on FIG. 1. The fiber is of known type and includes, for example, a central glass core 12, a glass cladding layer 14, a relatively soft primary plastic encapsulating layer 16 and a relatively hard secondary plastic encapsulating layer 18. For purposes of color encoding the fiber 10, it also includes a thin outer cladding layer 20. Color coding of optical fibers is known, and a recent development is the use of color pigmented UV acrylate materials. Such materials are plastic-like and are conveniently applied to the fiber as a fluid. Then, the fluid coating on the fiber is exposed to UV illumination for causing chemical hardening of the coating. Although the coloring layer 20 is quite thin, e.g., 2.5 microns, it is relatively tough and adheres well to the underlying fiber.

In use of the color coded fibers, cables of differently colored fibers are laid within a communication network and individual subscribers are connected to the network by known spicing techniques. The color coded fibers facilitate selection of fibers for connection to corresponding subscriber lines. Splicing comprises precisely slicing entirely through encapsulated fibers to be joined and joining together the two fibers in aligned, face to face relationship. A part of a slicing process involves wet etching through the primary and secondary plastic layers 16 and 18. The pigments used in the colored layer 20 tend to contaminate the etchant used, hence the colored layer 20 is preferably preliminarily removed from a small length of the fiber where etching is to be performed. Such removal is accomplished in accordance with this invention.

An apparatus 30 for stripping the colored layer 20 without damaging the underlying fiber 10 is shown in FIGS. 2–5.

The apparatus is primarily intended for use in the field and is preferably hand operable. It is small, light of weight and rugged. The embodiment described herein also makes use of commercially available products of proven reliability.

The apparatus 30 comprises (FIG. 2) a support plate 32 on which other portions of the apparatus are firmly fixed. Such other portions include a central block 34 of inverted U-shape and a pair of end blocks 36 at opposite ends of the apparatus. Mounted on the central block 34 is a lifting assembly 38 comprising a support base 40 mounted on the end of a lifting screw 42 passing through the upper portion 44 of the central block 34 and operable by means of a thumb screw 46. The thumb screw 46 is threadedly engaged with the screw 42 but held in fixed vertical position relative to the block portion 44. Thus, in known manner, rotation of the thumb screw 46, e.g., by hand, causes raising or lowering of the support base 40 relative to the central block 34. For mounting the support base 40 precisely horizontal during its vertical movements, a pair of guide pins 48 secured to the support base 40 pass through precisely parallel guide openings through the block upper portion 44.

Fixedly mounted on the support base 40 is a track 52 and a slide plate 44 mounted on the track 52 for back and forth sliding movements along the track. It is important that the slide plate 44 moves precisely parallel to a principal axis 60 of the apparatus. As described hereinafter, such principal axis 60 corresponds to the disposition of an optical fiber 10 mounted on the apparatus 30 for stripping. Track and slide assemblies of sufficient precision are commercially available and, in the present embodiment, a track-slide assembly known as a "ball slide" assembly available from Newport Corp. is used.

Figure 4:
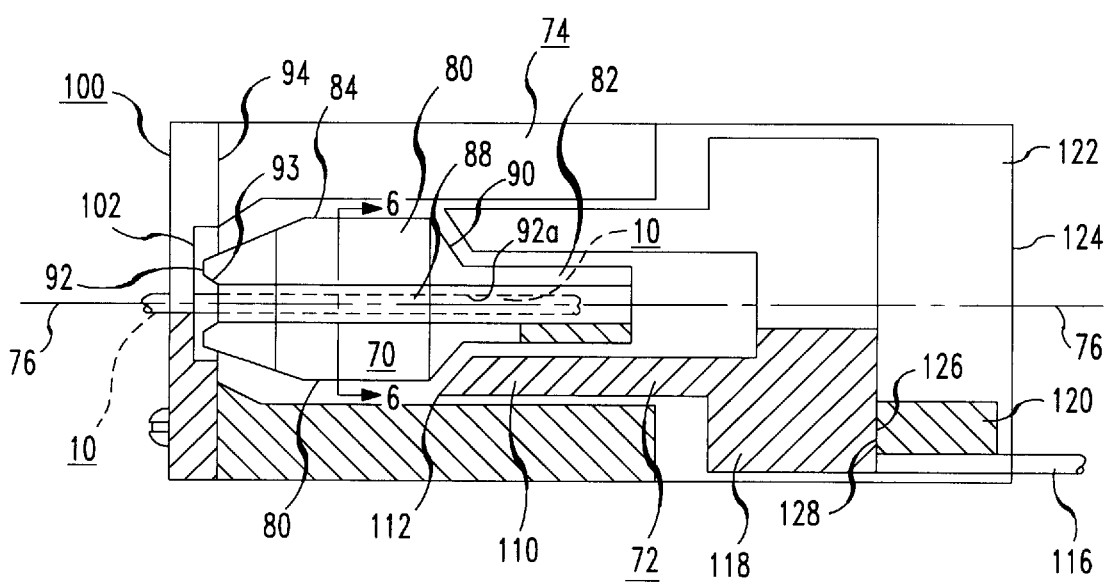
FIG. 4 is a section taken along line 4—4 of FIG. 1, on an enlarged scale, of a chuck assembly portion of the apparatus shown in FIG. 1.
Figure 5:
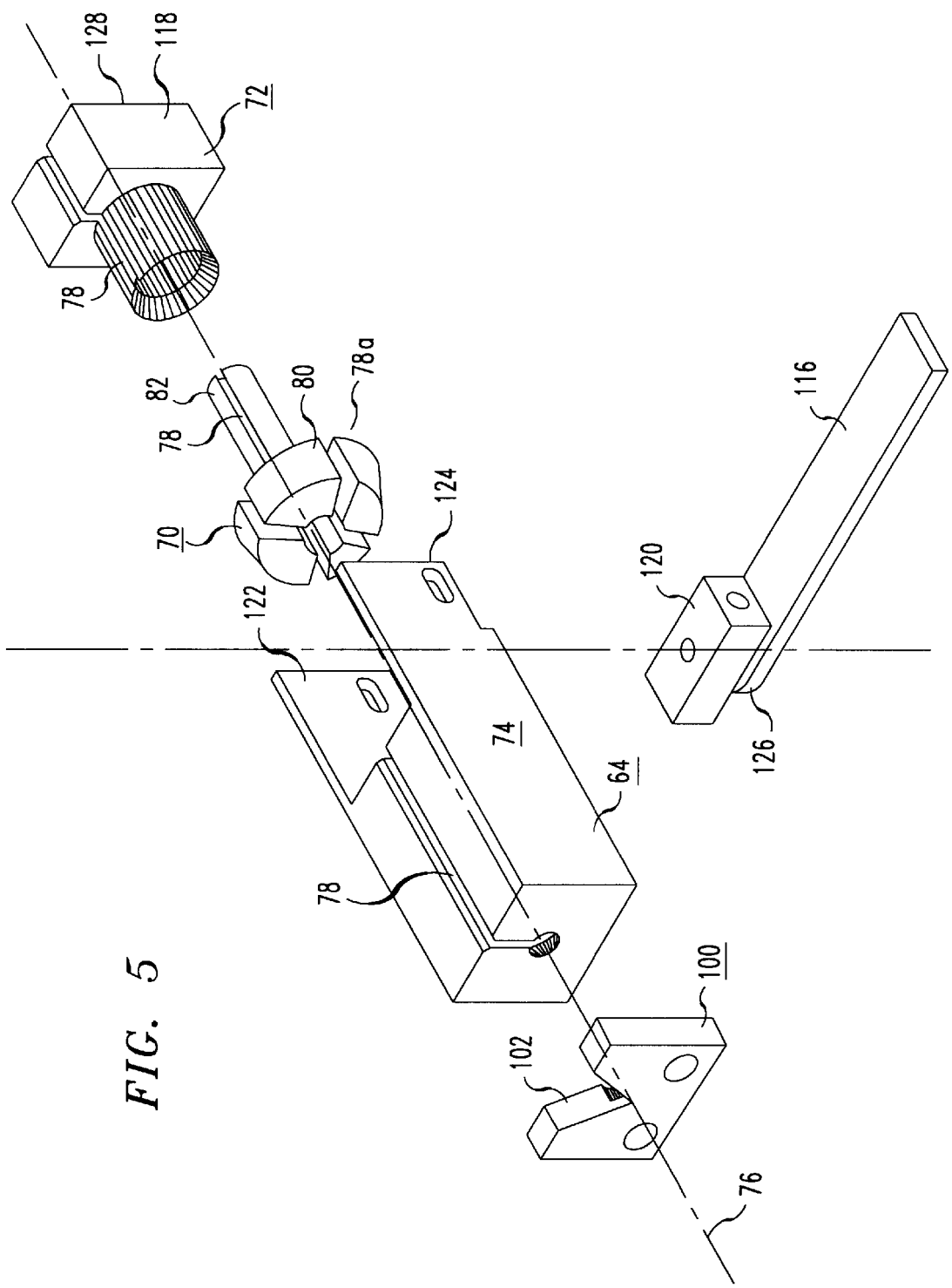
FIG. 5 is an exploded view, in perspective, of the chuck assembly shown in FIG. 4.

Fixedly mounted on the slide plate 44 for axial movement therewith is a chuck assembly 64 shown on enlarged scale in FIGS. 4 and 5. In use, as hereinafter further described, an optical fiber 10 is disposed axially of the assembly 64, a chuck 70 is moved into operable engagement with the fiber 10, and the chuck assembly 64 is then moved axially back and forth relative to the fiber for abrading and removing the fiber coating 20.

The chuck assembly 64 comprises (FIG. 5) three principal parts: the aforementioned chuck 70; a plunger 72 for controlling opening and closing of the chuck 70; and a housing 74 for receipt and mounting of the other named parts.

The chuck assembly 64 has a principal axis 76 along which an optical fiber 10 to be stripped is to be disposed and, for entry and exit of the fiber into and out of the assembly 64, all the assembly parts include axially aligned slots 78. The slots 78 begin at upper surfaces of the chuck assembly parts and extend vertically therethrough to the assembly axis 76. Thus, with an optical fiber 10 (shown in dashed lines in FIG. 2) fixedly and tautly suspended between the two end blocks 36 of the apparatus, movement of the fiber 10 inwardly and outwardly of the chuck assembly 64 is achieved by raising and lowering, respectively, the chuck assembly 64 by means of the lifting assembly 38.

The chuck 70 is similar in function to known chucks used for holding elongated drill bits in drilling machines. Herein, the chuck 70 includes a number of, e.g., four (FIG. 5), radially extending jaws 80 disposed circumferentially around the chuck axis 76. Each jaw 80 is a cantilevered extension from a common shank 82, and, without external forces, the jaws are all slightly spaced apart from one another. A convenient method of fabrication of the chuck 70 comprises shaping an elongated block of metal to the external configuration shown best in FIG. 5, i.e., with end connected "front" and "shank" cylinders 84 and 82 of different outside diameters; drilling a central opening 88 through the entire length of the block; and then milling four radial slots 78 and 78a extending from the outer surfaces of the two cylinders to the central opening 88. The radial slots extend along the entire length of the front cylinder 84, thereby forming the four radially extending jaws 80, and partially (see FIG. 4) along the shank cylinder 82. The front 84 and shank 82 cylinders are interconnected by a conic surface 90 (FIG. 4), and the application of radially inwardly directed forces against the conic surface 90 causes radially inward movements of the jaws.

By virtue of the centrally drilled opening 88, the inner faces 92 (FIG. 6) of the four jaws 80 define circumferentially spaced apart portions of a circular cylindrical surface. When the jaws 80 are radially closed (FIG. 7), the parallel sides of the jaws contact one another simultaneously with the inner faces of the jaws forming a continuous, circular cylindrical surface of precise cross-sectional shape and dimensions. Also, the mutual contacting of the jaws defines a precise minimum diameter of the circular passageway 88 through the chuck 70. Such minimum diameter is slightly less than the nominal outer diameter of a fiber to be stripped. This is further discussed hereinafter. Also, while the passageway 88 formed by the closed jaws 80 has a constant diameter along its central length, at the front end 92 (FIG. 4) of the chuck 70 the diameter of the passageway slightly increases, e.g., by means of a small counter bore 93. When the jaws 80 are radially closed, a similar increase in passageway diameter occurs at the rear end 93a of the passageway through the jaws portion 84 of the chuck where the chuck jaws 80 are joined to the shank 82.

In addition to the aforementioned four radial slots 78, 78a milled into the chuck block of metal, one of the four slots is extended (FIG. 5) along the entire length of the shank 82 to provide the aforementioned slot 78 for admission of the optical fiber 10.

As shown in FIG. 4, the chuck 70 is disposed within the housing 74 towards the front end 94 thereof. A fiber guide plate 100 is mounted on the housing front end 94, as by screws, and includes a downwardly extending V-notch 102 having a concave bottom surface precisely aligned with the passageway through the chuck. Specifically, the notch concave bottom surface is formed around an elongated axis precisely in-line with the principal axis 76 through the chuck 70. When an optical fiber is disposed at the bottom of the notch 102, the fiber central axis is precisely aligned with the principal axis 76 of the chuck assembly. (FIG. 4 shows the chuck 70 in its "open" or expanded condition.)

Also disposed within the housing 74 is the aforementioned plunger 72. The plunger 72 comprises a forwardly extending hollow cylinder 110 which is slidably mounted on the shank portion 82 of the chuck 70 and on the conic surface 90 joining the shank portion 82 to the jaws 80. The leading end 112 of the cylinder 110 is rearwardly-inwardly tapered in conformity with the chuck conic surface 90, and forward movement of the plunger 72 relative to the chuck 70 causes squeezing of the chuck conic surface for causing the afore-described jaws closing movement. Upon rearward movement of the plunger 72, the chuck jaws spring open.

Conveniently, the plunger is spring biased in one direction, and a pivoted arm 116 is provided for urging the plunger in the direction against its bias. As shown in FIGS. 4 and 5, the plunger 72 ends in a rearwardly facing block 118 which is engaged and maintained in place by a cross plate 120 secured, as by screws, between side walls 122 at the rear end 124 of the housing 74. The arm 116 is pivotally mounted on the cross plate 120 and includes an arcuate cam surface at the inner end 126 of the arm 116 which engages the rear end 128 of the plunger block 118. Accordingly, by rotating the arm 116, the plunger 72 is moved either forwardly for closing the chuck jaws or rearwardly for opening the jaws.

As previously described, the chuck 70 functions to strip the outer coating 20 from a fiber 10 suspended between the two end blocks 36. To this end, a fiber clamp 134 (FIG. 2) is mounted on each of the blocks 36. Fiber clamps are commercially available and the choice of clamps is not critical. It is important, however, that the optical fiber being stripped is disposed relatively tautly in precise alignment with the principal axis 60 of the apparatus 30. A preferred clamping arrangement is as follows.

Figure 2:
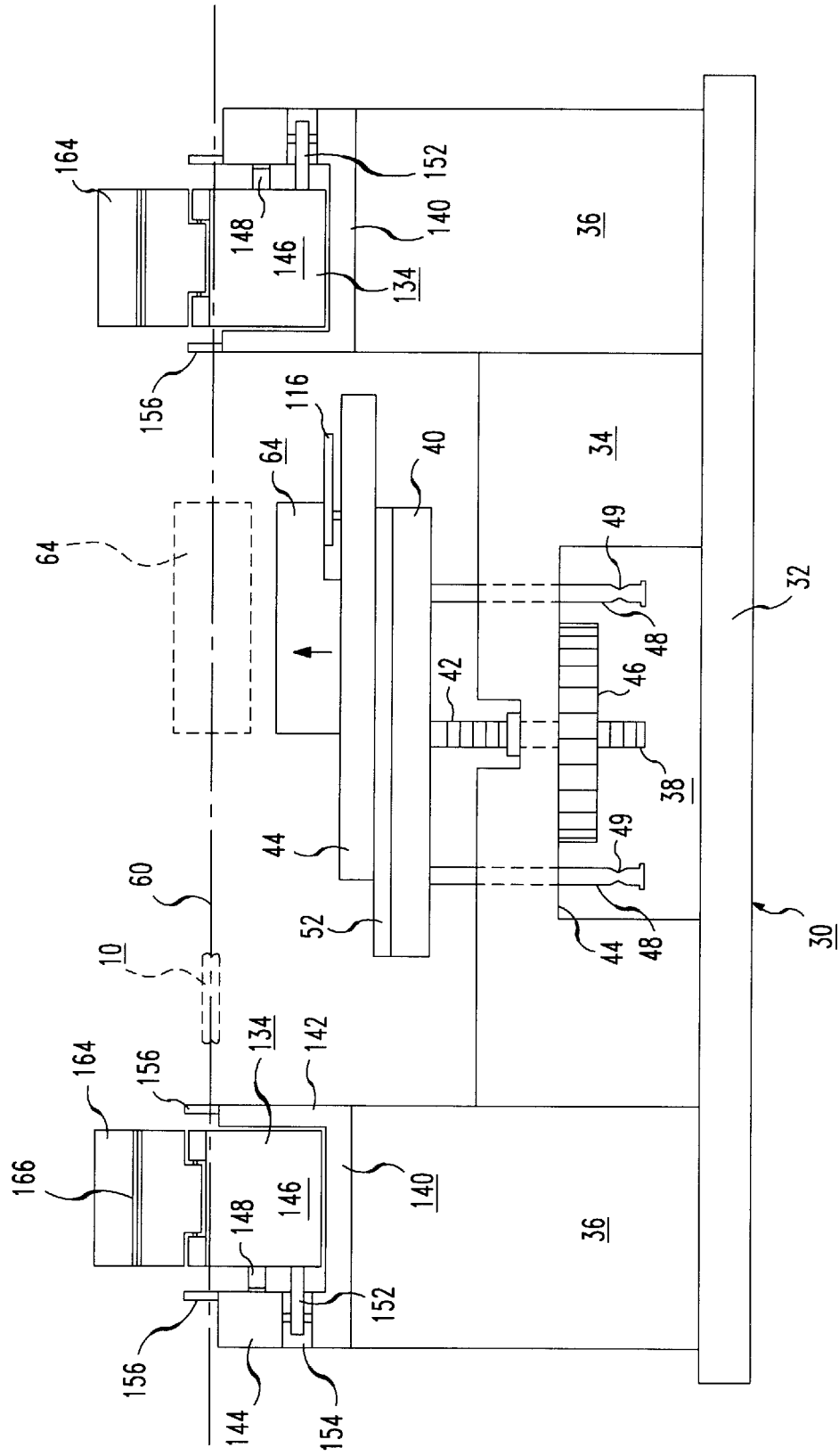
FIG. 2 is a side elevation of a stripping apparatus according to this invention.

Each end block 36 terminates in a generally U-shaped support block 140 having "inner" and "outer" legs 142 and 144. By "inner" is meant that the legs 142 face towards the chuck assembly 64 disposed between the two end blocks 36. Slidably mounted for precise axial movement between each pair of legs 142 and 144 is a clamping block 146. The blocks 146 are slidably mounted on guide rods 148 extending between the support block legs 142 and 144, and compression springs (not visible) are disposed on the rods 148 for biasing the clamping blocks 146 "outwardly" towards the outer legs 144 of the support blocks 140. FIGS. 2 and 3 show the clamping blocks 146 pushed "inwardly" towards the inner legs 142. The position of the clamping blocks 146 is under the control of a pivoted arm 152 mounted within a slot 154 in the outer leg 144 of each end block 140. Each arm 152 has a cam end surface effective for causing, either directly by pushing or indirectly by the biasing spring, axial movement of the corresponding clamping block 146 dependent upon the direction of rotation of the arm 152.

Each support block leg 142 and 144 has mounted thereon a fiber guide 156 comprising a vertical post having a downwardly extending V-notch 158 (FIG. 3). The bottom surfaces of the V-notches 158 have a circular cross-section, and the notch bottom surfaces are precisely aligned with a circular bottom surface of an axially extending notch 160 in the top surface 162 of each clamping block 146. All the notches on the clamping blocks 146 and fiber guides 156 are exactly aligned with one another and with the principal axis 60 of the apparatus. For releasably clamping a fiber 10 in place, a clamp plate 164 is rotatably mounted along an edge of each clamping block 146. The plate 164 contains an elongated notch 166 (FIG. 2) which precisely aligns with the notch 160 in the clamping block surface 162 when the plate 164 is rotated downwardly against the block surface 162. Conveniently, the plates 164 are magnetized, and magnetic force is used to tightly clamp each plate 164 against the corresponding block surface 162 for securely clamping in place an optical fiber 10 disposed within the notches 160 and 166.

In use of the two clamping blocks 146 for tautly mounting a fiber in precise axial alignment with the apparatus, a length of a continuous fiber 10 to be stripped is first disposed between the fiber guides 156 of one of the clamping blocks 146. By pulling the fiber length tautly between the guides and downwardly against the bottom surfaces thereof, the fiber length is also disposed within the notch 160 in the clamping block surface 162. The clamping plate 164 is then closed to firmly clamp the fiber in place. At this time, as shown in FIGS. 2 and 3, the clamping block 146 is in its "inner" position against the inner leg 142 of the support block 140.

Then, the fiber 10 is extended over the chuck assembly 64, which is in its lowered position as shown in solid lines in FIG. 2, and the fiber 10 then firmly seated and clamped within the other clamping block 146 which is also, initially, in its "inner" position. At this time, the fiber is not under tension but without excessive droop. Then, the two pivotable arms 152 associated with the two clamps are rotated to allow the clamping blocks 146 to be forced away, by spring pressure, from the "inner" legs 142 of the support blocks 140 towards the outer legs 144. These movements of the clamping blocks 146 place the optical fiber 10 under tension and stretched precisely along the principal axis 60 of the apparatus.

Optical fibers are relatively strong and the amount of tension used can vary over a relatively wide range, e.g., 1–4 pounds and higher depending upon the particular fiber used.

Figure 6:
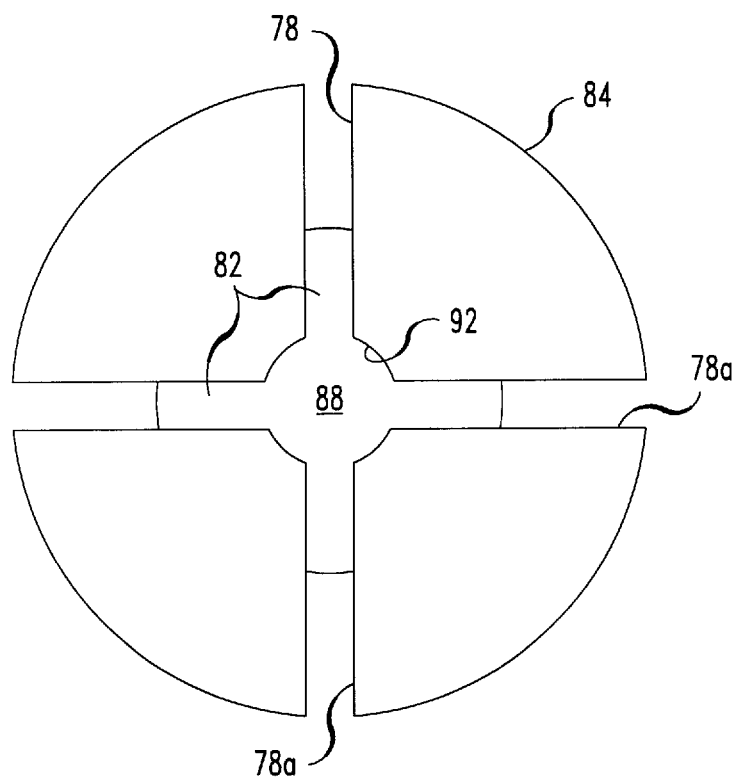
FIGS. 6 and 7 are cross-sections taken along line 6—6 of FIG. 4 showing a chuck shown in FIG. 4 in expanded and collapsed condition, respectively.
Figure 7:
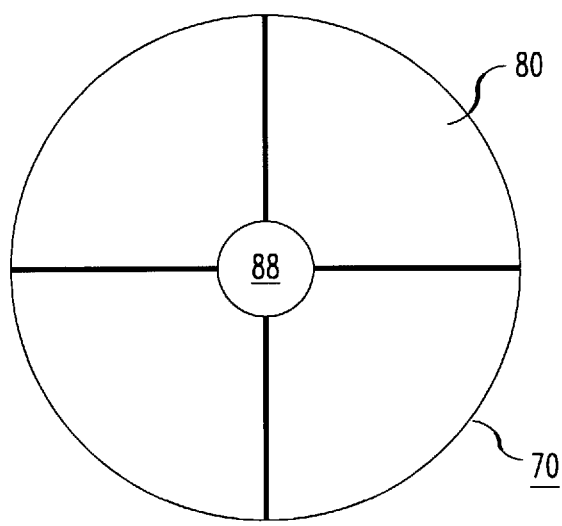

With the optical fiber to be stripped mounted on the apparatus 30, the thumb screw 46 is rotated for lifting the chuck assembly 64 for passing the stretched fiber 10 through the aligned vertical slots 78 running the length of the chuck assembly. At this time, the plunger 72 (FIG. 4) is in its rearward position and the jaws 80 of the chuck 70 are in their radially outer positions as shown in FIG. 6. Preferably, adjustable top means, acting in combination with V-notches 49 (FIG. 2) in the guide pins 48, are provided for limiting upward movement of the chuck assembly 64 and locking it in place in precise axial alignment with the optical fiber 10.

Then, the plunger pivot arm 116 (FIG. 4) is rotated for moving the plunger 72 forward against the conic surface 90 of the chuck 70 for closing the chuck jaws 80 onto the fiber within the chuck. As previously described, the jaws contact one another to form (FIG. 7) a continuous, circular cylindrical passageway of precise diameter. The passageway diameter is slightly less than the outer diameter of the fiber and the fiber is thus slightly radially compressed by the jaws.

The total compression of the fiber is relatively small, e.g., around 50 microns, and this small compression is readily absorbed by the relatively soft fiber primary plastic coating 16 (FIG. 1) without damage of the glass portions of the fiber.

As indicated in FIG. 4 by dashed lines, the fiber 10 extends beyond the ends 90 and 90a of the passageway 88 through the chuck and, outside the passageway 88, the fiber remains uncompressed. The transition between the compressed and uncompressed portions of the fiber 10 results in the outer, color coating 20, e.g., of only 2.5 microns thickness, experiencing a relatively large amount of bending in comparison to its thickness. Such sharp bending tends to cause cracking of the coating 20.

Then, the chuck assembly 64, mounted on the slide plate 44 (FIG. 2) for axial movement along the fixed track 52, is moved by hand axially back and forth relative to the stretched fiber. Owing to the relatively small amount of fiber compression and easy absorption thereof by the fiber relatively soft primary layer 16, the chuck assembly, with the chuck jaws locked in their closed position, slides quite easily relative to the stationary fiber without danger of breaking the fiber. However, as the closed chuck moves back and forth along the fiber, the repeated bendings and compressions of the thin outer fiber coating 20 cause abrasion of the layer into tiny particles which fall off the fiber. The layer 20 particles tend to pile up within the chuck assembly and along the fiber but are readily removed, e.g., by a jet of air.

The stripped fiber is then removed from the apparatus and is then ready to be further treated for splicing. Significantly, however, in spite of the abrading process performed for removing the outer coating 20, the underlying glass cladding 14 and glass core 12 of the stripped fiber remain completely undamaged.

It is claimed:

1. A method of stripping an outer plastic coating from an optical fiber comprising the steps of disposing an optical fiber to be stripped along an axis of a passageway through a chuck including radially convergible jaws, faces of said jaws defining circumferentially spaced apart wall portions of said passageway, converging said jaws radially inwardly for mutually engaging said jaws with one another for joining faces of said jaws in a smooth and continuous circular cylindrical surface for compressively and circumferentially engaging an outer surface of the fiber, and moving said chuck relative to said fiber along said axis for removing an outer layer of said fiber from said fiber.

2. A method according to claim 1 wherein said joining step includes forming said cylindrical surface with a central length portion extending between two end length portions, said central length portion being of uniform diameter along the length thereof, and said end length portions being of increasing diameters in directions away from said central portion and towards end faces of said chuck, and said moving step comprises moving said chuck back and forth relative to said fiber.

3. A method according to claim 1 wherein said step of disposing said fiber comprises suspending said fiber between two fixedly spaced apart fiber clamps, and said step of moving said chuck comprises moving said chuck between said clamps.

4. A method of stripping an outer plastic coating from an optical fiber comprising the steps of disposing an optical fiber to be stripped along an axis of a passageway through a chuck including radially convergible jaws, faces of said jaws defining circumferentially spaced apart wall portions of said passageway, converging said jaws radially inwardly for compressively and circumferentially engaging an outer surface of the fiber, and moving said chuck relative to said fiber along said axis for removing an outer layer of said fiber from said fiber, said chuck being mounted on a rail for movement therealong, and, prior to said converging step, clamping a length of said fiber in parallel relationship to said rail and spaced from said rail and from said chuck in a first direction, and moving said chuck along said first direction for inserting said fiber into said chuck and along said passageway.

5. An apparatus for stripping a plastic coating from an optical fiber comprising a rail, a chuck mounted on said rail for movement therealong, said chuck including radially convergible jaws defining spaced apart, circular cylindrical wall sections of a passageway through said chuck, means for disposing a fiber within said passageway and coaxial therewith and in fixed relationship with said rail, means for converging said jaws for reducing the inner diameter of said passageway for causing compressive engagement of said jaws with a fiber within said passageway, said jaws being convergible into mutually engaging relationship for providing a smooth and continuous wall of said passageway when of reduced diameter, and said passageway comprising a central section and two end sections, said central section being of uniform diameter along the entire length thereof, and said end sections being of increasing diameter in directions away from said central section.

6. An apparatus for stripping a plastic coating from an optical fiber comprising a rail, a chuck mounted on said rail for movement therealong, said chuck including radially convergible jaws defining spaced apart, circular cylindrical wall sections of a passageway through said chuck, means for disposing a fiber within said passageway and coaxial therewith and in fixed relationship with said rail, and means for converging said jaws for reducing the inner diameter of said passageway for causing compressive engagement of said jaws with a fiber within said passageway, said fiber disposing means comprising a pair of clamps for holding a fiber in spaced apart relationship to said rail and, in a set-up position of the apparatus, in spaced apart relationship with said chuck, and means for moving said chuck transversely of said rail for disposing said fiber in said passageway.

7. A method of stripping an outer plastic coating from an optical fiber comprising the steps of disposing an optical fiber to be stripped along an axis of a passageway through a chuck including radially convergible jaws, faces of said jaws defining circumferentially spaced apart wall portions of said passageway, converging said jaws radially inwardly for compressively and circumferentially engaging an outer surface of the fiber for forming a zone in said fiber where said outer coating is compressively bent, and moving said chuck relative to said fiber for moving said zone axially along and through a length of said outer coating for cracking and removing said outer coating length from said fiber.

* * * * *